United States Patent
Meyers

(10) Patent No.: US 11,663,897 B2
(45) Date of Patent: May 30, 2023

(54) APPARATUS FOR ANCHORING A FALL PROTECTION SYSTEM AND TRANSMITTING A FALL ALERT

(71) Applicant: Joseph Clinton Meyers, Corn, OK (US)

(72) Inventor: Joseph Clinton Meyers, Corn, OK (US)

(73) Assignee: Joseph Clinton Meyers, Corn, OK (US)

( * ) Notice: Subject to any disclaimer, the term of this patent is extended or adjusted under 35 U.S.C. 154(b) by 210 days.

(21) Appl. No.: 17/375,116

(22) Filed: Jul. 14, 2021

(65) Prior Publication Data

US 2022/0254240 A1    Aug. 11, 2022

Related U.S. Application Data

(60) Provisional application No. 63/052,593, filed on Jul. 16, 2020.

(51) Int. Cl.
| | |
|---|---|
| *G08B 21/00* | (2006.01) |
| *G08B 21/04* | (2006.01) |
| *A62B 35/00* | (2006.01) |
| *H04W 4/80* | (2018.01) |
| *G06F 13/42* | (2006.01) |

(52) U.S. Cl.
CPC ........ *G08B 21/043* (2013.01); *A62B 35/0068* (2013.01); *A62B 35/0075* (2013.01); *G06F 13/4282* (2013.01); *H04W 4/80* (2018.02); *G06F 2213/0042* (2013.01)

(58) Field of Classification Search
CPC .............. G08B 21/043; A62B 35/0068; A62B 35/0075; G06F 13/4282; G06F 2213/0042; H04W 4/80

USPC .................................................... 340/539.11
See application file for complete search history.

(56) References Cited

U.S. PATENT DOCUMENTS

| | | | |
|---|---|---|---|
| 4,660,679 A * | 4/1987 | Ostrobrod | B66C 5/025 116/202 |
| 4,858,622 A | 8/1989 | Osterweil | |
| 7,106,205 B2 * | 9/2006 | Graef | A62B 35/0012 340/687 |
| 8,928,482 B2 | 1/2015 | Flynt | |
| 9,153,115 B1 | 10/2015 | Ulnar | |
| 2010/0231402 A1 | 9/2010 | Flynt et al. | |
| 2011/0090079 A1 * | 4/2011 | Morino | A62B 35/0075 340/532 |

(Continued)

FOREIGN PATENT DOCUMENTS

GB    2486012 A  *  6/2012  ......... A62B 35/0075

OTHER PUBLICATIONS

PCT/US2022/027069, International Search Report and Written Opinion; dated Aug. 19, 2022.

(Continued)

*Primary Examiner* — Mark S Rushing
(74) *Attorney, Agent, or Firm* — Dennis D. Brown; Brown Patent Law, P.L.L.C.

(57) ABSTRACT

A weight-activated anchoring and alerting apparatus which serves as both (a) an anchoring device or anchoring extension for a fall arrest or other fall protection system and (b) an automatic alarm system which notifies rescue personnel or others when the worker, hunter, or other person wearing the fall protection system has fallen and is in need of rescue.

14 Claims, 3 Drawing Sheets

(56) References Cited

U.S. PATENT DOCUMENTS

| | | | |
|---|---|---|---|
| 2012/0050036 A1* | 3/2012 | Landry .............. | A62B 35/0018 |
| | | | 182/3 |
| 2015/0265860 A1* | 9/2015 | Kennedy ............ | A62B 35/0075 |
| | | | 182/3 |
| 2020/0260824 A1* | 8/2020 | Moran ................ | A44B 11/2519 |
| 2021/0031062 A1* | 2/2021 | Huseth ............... | A62B 35/0037 |

OTHER PUBLICATIONS

Fieldsense FS60 5G Personal RF Monitor: GME Climb Higher Supply Co., www.gmesupply.com/fieldsense-fs60-personal-rf-monitor.

* cited by examiner

APPARATUS FOR ANCHORING A FALL PROTECTION SYSTEM AND TRANSMITTING A FALL ALERT

RELATED CASE

This application claims the benefit of U.S. Provisional Patent Application Ser. No. 63/052,593 filed on Jul. 16, 2020 and incorporates the provisional application by reference into this document as if fully set out at this point.

FIELD OF THE INVENTION

The present invention relates to an apparatus which anchors, or extends the anchor of, a fall protection system and provides an alert in the event that a fall occurs.

BACKGROUND OF THE INVENTION

Fall arrest systems or other fall protection systems are required to be used by roofers, oilfield workers, plant and factory workers, window washers, hunters, and others who are working, or are otherwise positioned, at elevations involving a potential fall of four feet or more. A fall arrest system will typically include a body harness, an anchor, and a connector. The connector will typically comprise a lanyard, a deceleration device, a lifeline, some other connecting device, or a combination thereof for connecting the body harness to the anchor.

Orthostatic intolerance is a serious and potentially fatal condition that may be experienced by workers, hunters, or others who have fallen and are suspended in a fall arrest system. The suspended worker suffers from a combination of (i) the pressure that the harness exerts on the body plus (ii) sustained immobility. Depending on the length of time that the suspended worker is unconscious/immobile and the level of venous pooling which occurs, the resulting orthostatic intolerance may lead to death. Such fatalities are referred to as "Harness-Induced Pathology" or "Suspension Trauma". Individuals who are also injured in the course of the fall have an even higher risk of a poor outcome. Therefore, for these reasons, and in accordance with OSHA requirements, it is imperative that rescue procedures be initiated immediately in the event of a fall.

Consequently, a need exists for a system which will provide an immediate, automated alert to rescue personnel or others whenever a fall has occurred. Such a system will preferably not only provide an immediate alert, but will also be effective for alerting rescue personnel or others when the individual wearing the fall protection system is alone in an isolated location. Many hunters and other individuals who are alone in isolated locations often will not use appropriate fall protection systems due to fear that (a) they will not be able to call or telephone for help due to unconsciousness, loss of their cell phone during the fall, or other reasons and (b) the injuries resulting from being stranded in suspension may be worse than the fall.

SUMMARY OF THE INVENTION

The present invention provides a weight-activated anchoring and alerting apparatus which satisfies the needs and alleviates the problems discussed above. The inventive apparatus serves as both an anchor point extension for fall protection, and as an alarm system that sends a safety alert to other personnel when it detects that an employee, hunter, or other individual has fallen and needs rescue. This immediate alert allows for the quickest available response and greatly reduces the risk of serious injury or death. The weight-activated anchorage point system can also replace the anchorage point (i.e., the tie off point) in a fall protection system. In initial tests, the inventive system provided pull test results of up to 25,000 lbs., giving the inventive system a 5:1 safety factor. It will work in any fall protection system as an anchorage point. The spring or other biasing or retaining element(s) used in the inventive system can be sized for different weights, depending on the application.

In one aspect, there is provided a device which is activated by the weight of the fallen person on the anchor, which in turn opens a circuit and triggers a response via Bluetooth to a cell phone or other device. When a person falls, a spring will preferably collapse allowing the switch to release, completing the circuit. Once the circuit is complete, a USB is preferably powered up and the Bluetooth transmitter powers on. The device can then send a signal to any Bluetooth receiver within range. In some applications, the device will be hardwired into, or can otherwise be in electronic communication with, for example, a supervisory control and data acquisition (SCADA) type system and viewed on a screen.

Alternatively, the inventive apparatus can automatically and immediately send a cell phone or other signal, or a combination of signals in the event that a fall occurs. The Bluetooth, cell phone, and/or other signal transmitted by the inventive system can be received by the user's cell phone for automatic relay to rescue personnel or others and/or can be sent to the rescue personnel or others directly.

In another aspect, there is provided an apparatus for anchoring, or extending an anchor of, a fall protection system and providing an alert that a fall has occurred. The apparatus preferably comprises: (a) a housing; (b) an electronic transmitting device in the housing; (c) a first switch element, located in the housing, which is electronically linked to the transmitting device; and (d) a second switch element having a distal end which extends into the housing, the second switch element also having a proximal end outside of the housing which will receive a pulling force exerted by a falling person wearing the fall protection system when the fall protection system is directly or indirectly connected to the apparatus. The second switch element is preferably retained in a contacting position with the first switch element by a retaining force which will be less than the pulling force exerted on the second switch element by the falling person wearing the fall protection system so that the pulling force exerted by the falling person will pull the second switch element out of contact with the first switch element and cause the electronic transmitting device to transmit a fall alert signal.

In another aspect, there is provided an apparatus for anchoring, or extending an anchor of, a fall protection system and providing an alert that a fall has occurred, wherein the apparatus preferably comprises: (a) a housing; (b) an electronic transmitting device in the housing; and (c) an electronic circuit in the housing which activates the electronic transmitting device either when the electronic circuit is open or when the electronic circuit is closed. The electronic circuit preferably comprises a first switch element and a second switch element for opening and closing the circuit. The second switch element preferably has (i) a distal end which extends into the housing and (b) a proximal end outside of the housing which will receive a pulling force exerted by a falling person wearing the fall protection system when the fall protection system is directly or indirectly connected to the apparatus. The second switch element is preferably retained in a first position with respect to the first switch element by a retaining force which is less than a pulling force exerted on the second switch element by a falling person wearing the fall protection system so that the pulling force exerted by the falling person will pull the second switch element to a second position with respect to the first switch element. The electronic transmitting device is preferably activated to transmit a fall alert signal when the second switch element is in the second position with respect to the first switch element but not when the second switch element is in the first position with respect to the first switch element.

Further aspects, features, and advantages of the present invention will be apparent to those in the art upon examining the accompanying drawings and upon reading the following detailed description of the preferred embodiments.

DETAILED DESCRIPTION OF THE PREFERRED EMBODIMENTS

Figure 1:
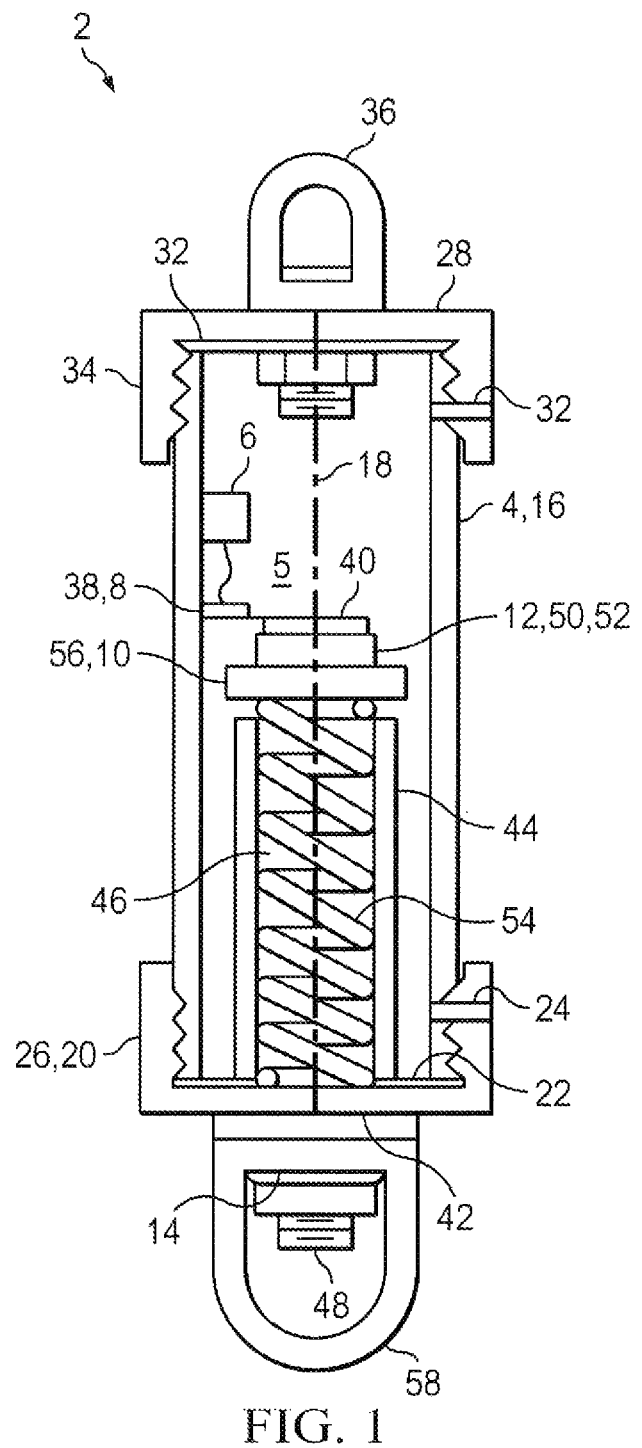
FIG. 1 is a cutaway elevational view of an embodiment 2 of the anchorage point alerting apparatus provided by the present invention.

An embodiment 2 of the anchorage point alerting apparatus provided by the present invention is illustrated in FIG. 1. The inventive apparatus 2 preferably comprises: a housing 4; a circuit board 6 which is positioned in the interior 5 of the housing 4, the circuit board 6 including an electronic transmitting device for transmitting an alert signal in the event of a fall; a first switch element 8 which is positioned in the interior 5 of the housing 4 and is wired or otherwise electronically linked to the circuit board 6 and the electronic transmitting device; and a second switch element 10 having (i) a distal end 12 which extends into the interior 5 of the housing 4 and (ii) a proximal end 14 which remains outside of the housing.

The housing 4 preferably comprises: a cylindrical pipe or tube segment 16 having a longitudinal axis 18; a first (lower) end cap 21) which is threadedly secured on the lower (first) end 22 of the pipe or tube segment 16; a roll pin 24 which extends through a longitudinally extending, internally threaded side wall 26 of the lower end cap 20 and through the sidewall of the pipe or tube segment 16 for locking the lower end cap 20 in fixed position on the lower end 22 of the pipe or tube segment 16; a second (upper) end cap 28 which is threadedly secured on the upper (second) end 30 of the pipe or tube segment 16; a roll pin 32 which extends through a longitudinally extending, internally threaded side wall 34 of the upper end cap 28 and through the sidewall of the pipe or tube segment 16 for locking the upper end cap 24 in fixed position on the upper end 30 of the pipe or tube segment 16; and an external eyelet or other connecting structure 36 which extends upwardly from the upper end cap 28 for connecting the inventive apparatus 2 at an anchoring point, or for connecting the inventive apparatus 2 to an anchoring device as an anchoring extension.

The first switch element 8 preferably comprises a micro switch 38 having a contacting plate 40 extending therefrom. The contacting plate 40 preferably extends laterally in the interior 5 of the housing 4 in a fixed position such that the contacting plate 40 (a) is substantially perpendicular to (i.e., perpendicular to or within ±10° of being perpendicular to) the longitudinal axis 5 of the housing 4 and (b) is in a contacting position above the distal end 12 of the second switch element 10.

The second switch element 10 extends through a central opening 42 of the lower end cap 20 and through an internal pipe or tube segment 44 which extends upwardly from the lower end cap 20 into the interior 5 of the housing 4. The second switch element 10 preferably comprises (i) a bolt 46 having a threaded lower (proximal) end 48 which projects downwardly from the central opening 42 of the lower end cap 20 and (ii) an upper (distal) end 50, on which the head 52 of the bolt 46 is located, which projects upwardly from the upper end of the internal pipe of tube segment 44. The second switch element 10 also preferably comprises: a coil spring 54 or other biasing element which is positioned within the internal pipe or tube segment 44 and which surrounds the bolt 46; a washer 56 which is positioned on the bolt 46 between the bolt head 52 and the upper end of the spring 54; and an eyelet (e.g., a lifting eyelet) or other connecting structure or device 58 which is secured on the proximal (lower) end 48 of the bolt 46 outside of the lower end cap 20 of the housing 4 for attaching a connector of a fall arrest system or other fall protection system to the inventive apparatus 2. It will be understood that the fall protection system can be directly connected to the lower connector 58 of the inventive apparatus 2 or can be indirectly connected. e.g., by attaching the fall protection system to an extension, a decelerating device, and/or other intermediate component installed between the inventive apparatus 2 and the fall protection system.

The spring 54 contacts the bottom of the washer 56 and (hereby continuously biases or urges the bolt 46 upwardly to provide a retaining force which retains the head 52 of the bolt 46 (i.e., the distal end 50 of the second switch element 10) in contact with the contacting plate 40 of the first switch element 8. The spring 54 will be sized such that the upward retaining force applied to the second switch element 10 by the spring 54 will be less than the downward pulling force applied to the second switch element by the weight of a fallen person.

Consequently, when the upper eyelet 36 of the inventive apparatus is connected at an anchor point, or connected to an anchoring device, and a fall protection system is connected to the external eyelet 58 at the lower end 48 of the second switch element 10, the downward pulling force exerted on the second switch element 10 by the weight of a falling individual will exceed the upward retaining force of the spring 54 so that the weight of the falling person will pull the distal (upper) end 50 of the second switch element 10 downwardly, out of contact with the contacting plate 40 of the first switch element 8. This in turn activates the electronic transmitting device on the circuit board 6 to transmit a fall signal. The upward retaining force exerted by the spring 54, which can be selected as desired, will preferably be in the range of from 20 to 50 pounds and will more preferably be about 35 pounds (i.e., 35 pounds+10%).

The outside diameter of the washer 56 on the upper end 50 of the second switch element 10 is preferably greater than the inside diameter of the internal pipe or tube segment 44 in the housing 4 so that the upper (distal) end 45 of internal pipe or tube segment 44 will contact the washer 56 and thereby stop and limit the downward movement of the second switch element 10 in the housing 4 when a fall occurs.

As noted above, the electronic transmitting device on the circuit board 6 can be a Bluetooth transmitter, a cell phone transmitter, any other type of transmitter, or a combination thereof. The fall alert signal can be received by a cell phone or other receiving device which is within an acceptable range for the type of transmitter in question and is programmed to (i) receive the fall alert signal, (ii) produce an audible and/or visible alert, and/or (iii) notify rescue workers or others. In the case of a cell phone transmitter, the fall alert signal can be received by rescuers or other individuals at any location, so long as the rescuer or other individual has, e.g., a cell phone with an app downloaded thereon with the programmed instructions for receiving the cell phone signal, producing the audible and/or visible alert, and/or transmitting further notifications. Alternatively, the cell phone, Bluetooth, or other signal could simply be received via an app on the user's cell phone which would then automatically send out alerts to rescuers or others.

The circuit board 6 of the inventive apparatus 2 will also preferably have a battery or other power source installed thereon or connected thereto. In addition, the inventive apparatus 2 can include a USB or other port on or connected thereto for charging the battery and/or for entering location coordinates, entering contact cell phone numbers, and/or inputting or downloading other information or instructions to or from a computer processing unit on the circuit board 6. Alternatively, or in addition, the circuit board 6 can include a GPS tracking chip which automatically provides the location of the user. The circuit board 6 used in the inventive apparatus 2 will preferably be a Raspberry Board.

Although the inventive apparatus 2 has been described as using a bolt 46 for the second switch element 10, it will be understood that a rod segment or other elongate member could alternatively be used for forming the second switch element 10.

In addition, although the second switch element 10 is described above as being initially retained in a contacting position with the first switch element 8, it will be understood that, e.g., the contacting plate or other contacting element 40 of the first switch element 8 could alternatively be relocated such that the second switch element 10 would be initially retained in an upper non-contacting position and then pulled downwardly by the weight of the falling person to a contacting position with the first switch element 8. In either case, regardless of whether the electronic circuit within the housing 4 created by contact between the first switch element 8 and the second switch element 10 is initially open or closed, the circuitry provided by the circuit board 6 can readily be adapted such that the fall alert signal is activated when the second switch element 10 is pulled to its second (lower) position by the weight of the falling person but is not activated while the second switch element is retained in its first (upper) position.

Figure 2:
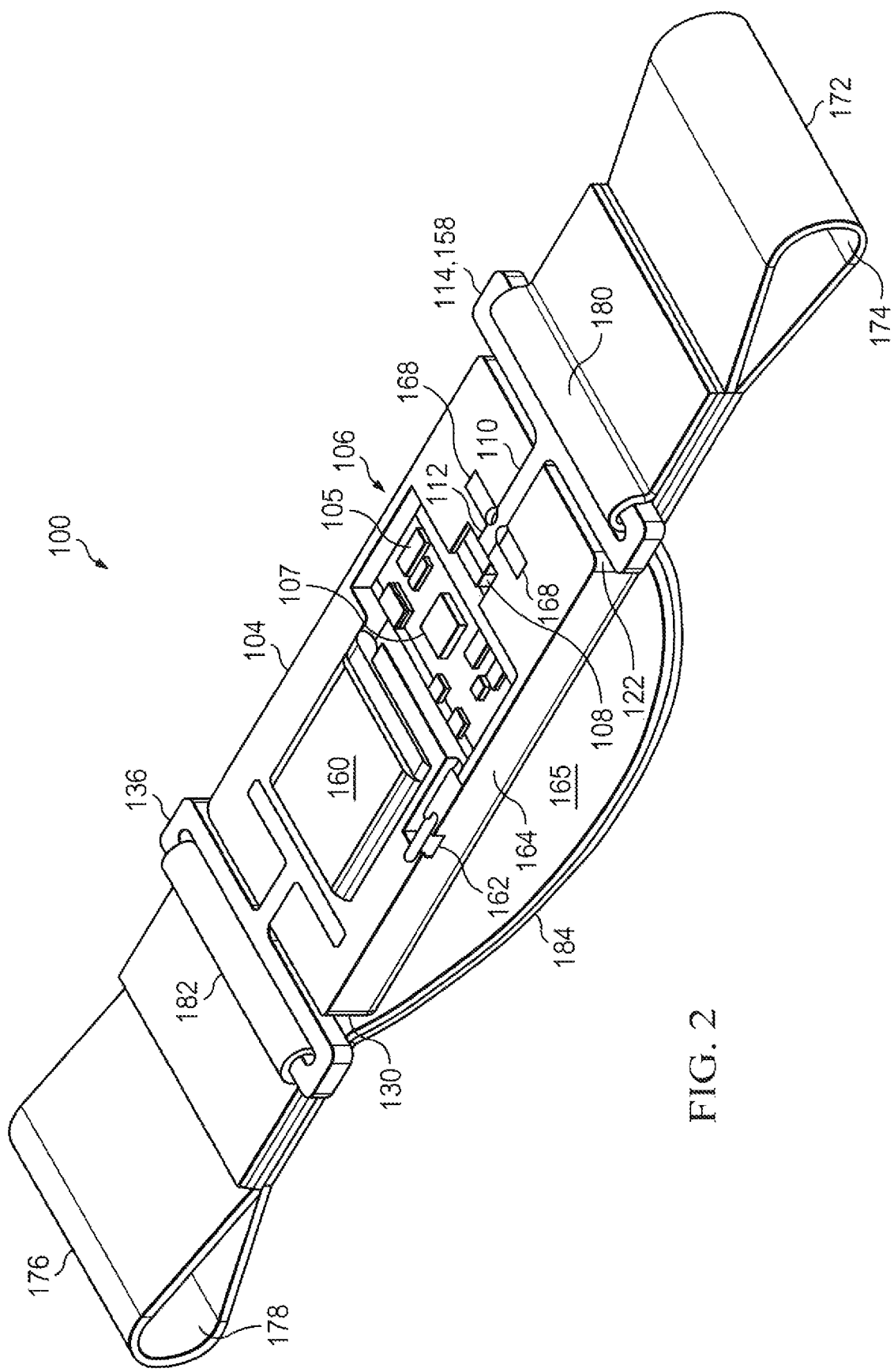
FIG. 2 is a perspective view of an alternative embodiment 100 of the inventive apparatus having the cover thereof removed.
Figure 3:
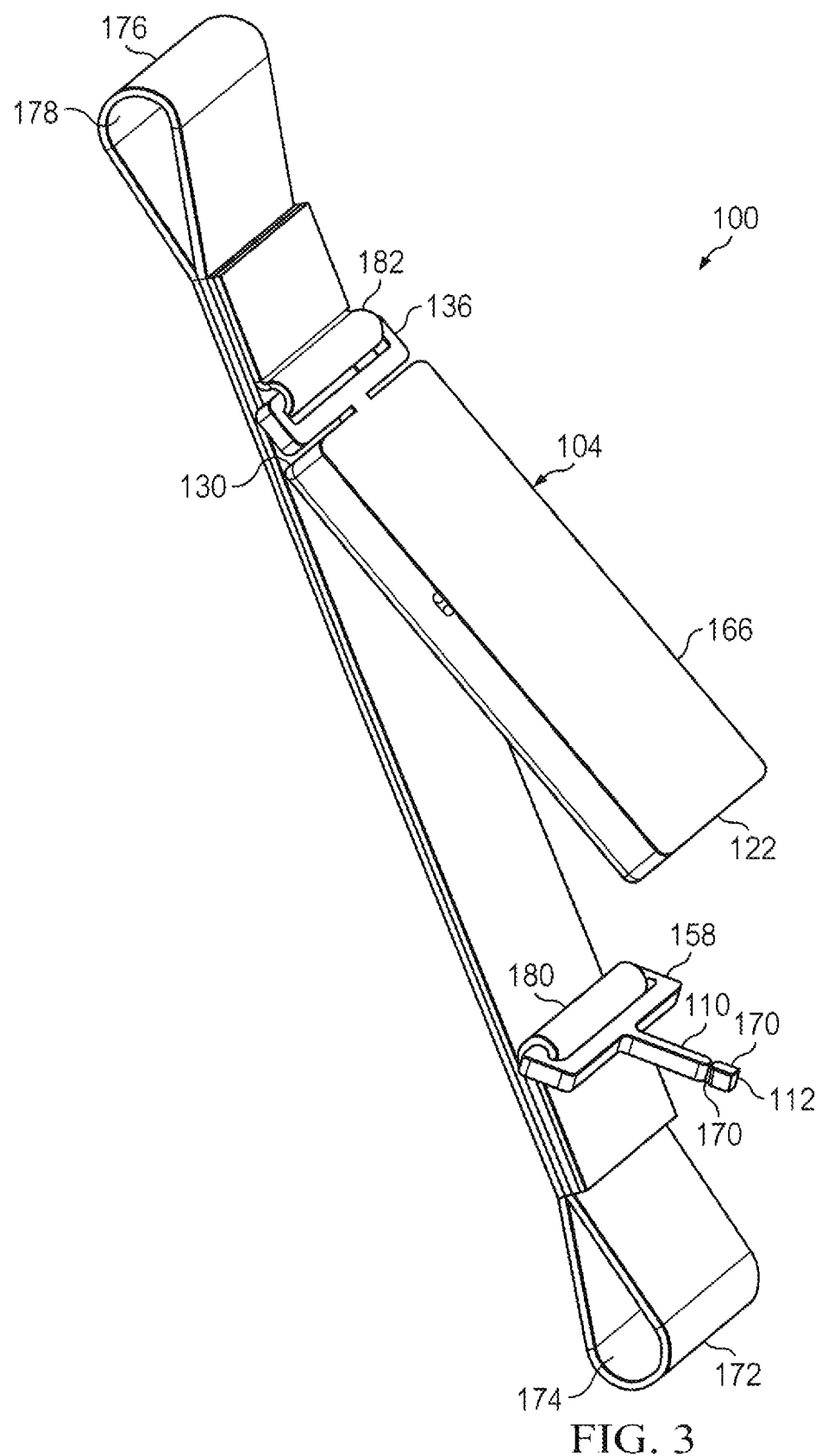
FIG. 3 is another perspective view of the inventive apparatus 100.

An alternative embodiment 100 of the anchorage point alerting apparatus provided by the present invention is illustrated in FIGS. 2 and 3. Like the embodiment 2 described above, the embodiment 100 of the inventive apparatus preferably comprises: a housing 104; a circuit board 106 (preferably a Raspberry Board) within the housing 104 having a Bluetooth, cell phone, and/or other electronic transmitting device 105 and a computer processing unit 107 thereon; a first switch element (e.g., a contact switch) 108 in the housing 104 which is electronically linked to the circuit board 106 and to the electronic transmitting device 105; a second switch element 110 having a distal end 112 which extends into the housing 104 and a proximal end 114 which remains outside of the lower (first) end 122 of the housing 104; an external connector 136 provided at and extending from the upper (second) end 130 of the housing 104; an external connector 158 outside of the housing 104 on the proximal (lower) end 114 of the second switch element 110; a battery or other power source 160 in the housing 104 which powers the components on the circuit board 106; and a USB or other port 162 for charging the power source 160, entering location coordinates, entering contact cell phone numbers, and/or inputting or downloading other information or instructions.

However, the alternative embodiment 100 of the inventive apparatus as illustrated in FIGS. 2 and 3 is different from the embodiment 2 illustrated in FIG. 1 in various respects. The housing 104 of the inventive apparatus 100 is preferably a flat rectangular structure comprising (i) a bottom tray 164 in which the electrical components of the apparatus 100 are mounted and (ii) a cover 166 which is removably positionable on the bottom tray 164. Also, the second switch element 110 of the of the inventive apparatus 100 preferably comprises a pull pin which will be completely removed from (i.e., pulled out of) the housing 104 when a fall occurs.

The retaining force required for retaining the distal (upper) end 112 of the pull pin 110 in contact with the first switch element 108 is provide by one or more spring-loaded pins 168 in the housing tray 164 which are substantially perpendicular to (i.e., perpendicular to or within ±10° of being perpendicular to) the pull pin 110. Most preferably, the inventive apparatus 100 comprises two spring-loaded pins 168 which are positioned on opposite sides of the pull pin 110. The two spring-loaded 168 pins have retaining ends which are received in corresponding retaining grooves or cavities 170 formed in the opposing sides of the pull pin 110.

In further contrast to the embodiment 2 illustrated in FIG. 1, the inventive apparatus 100 includes a load transfer strap or belt 165 which preferably comprises (i) a first (lower) end 172 having a loop 174 formed therein for holding an eyelet or other connection structure or device for directly or indirectly receiving a connector of a fall arrest system or other fall protection system and (ii) a second (upper) end 176 having a loop 178 formed therein for holding an eyelet or other connection structure or device for connecting the inventive apparatus 100 at an anchoring point or connecting inventive apparatus 100 to an anchoring device.

The external connector 158 outside of the housing 104 on the lower end 114 of the pull pin 110 is preferably a belt or strap connector which is connected to the load transfer strap or belt 165 at a location 180 on the load transfer strap or belt 165 which is closer to the lower end 172 than to the upper end 176 of the strap or belt 165. The external connector 136 provided at the upper end 130 of the housing 104 is preferably a belt or strap connector which is connected to the load transfer strap or belt 165 at a location 182 on the load transfer strap or belt 165 which is closer to the upper end 176 than to the lower end 172 of the strap or belt 165. In addition, the distance from the lower pin connection point 180 to the upper housing connection point 182 on the strap or belt 165 is greater than the longitudinal length of the housing 104 so that, until a fall occurs, a slack segment 184 exits in the load transfer strap or belt 165 between the pin and housing connection points 180 and 182.

Because of the slack segment 184 in the load transfer strap or belt 165, when a fall arrest or other fall protection system is directly or indirectly connected to the inventive apparatus 100, the pulling force which is exerted by a falling person wearing the fall protection system, and which is received by the lower end 172 of the strap or belt 165, will initially act to pull the pull pin 110 downwardly out of the housing 104 and out of contact with the first switch element 108. This will in turn automatically activate the electronic transmitting device 105 to transmit the fall alert signal. In addition, once the pull pin 110 is pulled from the housing 104, the slack in the load transfer strap or belt 165 will be removed and the pulling force exerted by the falling individual on the lower end 172 of the strap or belt 165 will then be directly transmitted through the load transfer strap or belt 165 to the upper end 176 of the strap or belt 165.

One benefit of using the load transfer strap or belt 165 is that, when the pin 110 is pulled from the housing 104 and the slack in the strap or belt 165 is removed, the weight of the suspended person is no longer born by the second switch element (i.e., the pull pin) 110 of the inventive apparatus 100. Another benefit of using the load transfer strap or belt 165 and the pull pin 110 is that, once a fall occurs and the pull pin 110 is removed from the housing 104, the system must be taken out of service so that the pin 110 can be reinstalled, and the system inspected, by a "competent person", thus ensuring that the OSHA requirements concerning a system which has been subjected to "impact loading" must be followed.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within the invention as defined by the claims.

What is claimed is:

1. An apparatus for anchoring, or extending an anchor of, a fall protection system and providing an alert that a fall has occurred, the apparatus comprising:
   a housing;
   an electronic transmitting device in the housing;
   a first switch element, located in the housing, which is electronically linked to the transmitting device;
   a second switch element having a distal end which extends into the housing, the second switch element also having a proximal end outside of the housing which will receive a pulling force exerted by a falling person wearing the fall protection system when the fall protection system is directly or indirectly connected to the apparatus;
   the second switch element being retained in a contacting position with the first switch element by a retaining force which will be less than the pulling force exerted on the second switch element by the falling person wearing the fall protection system so that the pulling force exerted by the falling person will pull the second switch element out of contact with the first switch element and cause the electronic transmitting device to transmit a fall alert signal;
   further comprising a biasing element which exerts the retaining force on the second switch element to retain the second switch element in the contacting position;
   the biasing element being a spring which is positioned in the housing around the second switch element and
   the spring having a distal end which pushes against a spring contacting structure on the second switch element;
   the second switch element extending through a pipe or tube segment inside the housing such that the spring contacting structure on the second switch element is positioned outside of a distal end of the pipe or tube segment and
   the spring is positioned in the pipe or tube segment around the second switch element.

2. The apparatus of claim 1 further comprising the electronic transmitting device being a Bluetooth transmitter.

3. The apparatus of claim 1 further comprising the electronic transmitting device being a cell phone transmitter.

4. The apparatus of claim 1 further comprising the first switch element comprising a contacting plate which is located in a fixed position in the housing, and which is contacted by the distal end of the second switch element when the second switch element is in the contacting position.

5. The apparatus of claim 1 further comprising an eyelet provided on the proximal end of the second switch element for directly or indirectly attaching a connector of the fall protection system.

6. The apparatus of claim 1 further comprising the second switch element comprising a bolt and the spring contacting structure being a washer positioned on the bolt.

7. The apparatus of claim 1 further comprising the electronic transmitting device being located on a circuit board.

8. The apparatus of claim 7 further comprising:
   a computer processing unit on the circuit board which is electronically linked to the electronic transmitting device and
   a USB port which is electronically linked to the computer processing unit.

9. The apparatus of claim 1 further comprising a cell phone which receives the alert signal, the cell phone having an app downloaded thereon comprising programmed instructions which cause the cell phone to produce an audible and/or visible alert when the alert signal is received.

10. The apparatus of claim 9 further comprising the programmed instructions causing the cell phone to transmit the audible and/or visible alert to other receivers.

11. An apparatus for anchoring, or extending an anchor of, a fall protection system and providing an alert that a fall has occurred, the apparatus comprising:
   a housing;
   an electronic transmitting device in the housing;
   a first switch element, located in the housing, which is electronically linked to the transmitting device;
   a second switch element having a distal end which extends into the housing, the second switch element also having a proximal end outside of the housing which will receive a pulling force exerted by a falling person wearing the fall protection system when the fall protection system is directly or indirectly connected to the apparatus;
   the second switch element being retained in a contacting position with the first switch element by a retaining force which will be less than the pulling force exerted on the second switch element by the falling person wearing the fall protection system so that the pulling force exerted by the falling person will pull the second switch element out of contact with the first switch element and cause the electronic transmitting device to transmit a fall alert signal;
   the second switch element comprising a pull pin, the distal end of the second switch element being a distal end of the pull pin and the proximal end of the second switch element being a proximal end of the pull pin;
further comprising:
   the pull pin extending into a first end of the housing;
   the apparatus further comprising a load transfer strap or belt having (i) a first end which will receive the pulling force exerted by the falling person wearing the fall protection system when the fall protection system is directly or indirectly connected to the first end of the load transfer strap or belt of the apparatus and (ii) a second end opposite the first end;

the proximal end of the pull pin being connected to the load transfer strap or belt at a first location on the load transfer strap or belt between the first end and the second end of the load transfer strap or belt, the first location on the load transfer strap or belt being closer to the first end than to the second end of the load transfer strap or belt;

the housing having a connecting structure at a second end of the housing, opposite the first end of the housing, which is connected to the load transfer strap or belt at a second location on the load transfer strap or belt between the first end and the second end of the load transfer strap or belt, the second location on the load transfer strap or belt being closer to the second end than to the first end of the load transfer strap or belt; and the second location on the load transfer strap or belt being separated from the first location on the load transfer strap or belt by a distance which is greater than a distance from the first end to the second end of the housing so that when the pulling force exerted by the falling person wearing the fall protection system is received by the first end of the load transfer strap or belt, the pulling force will initially act to pull the pull pin out of the first end of the housing.

12. An apparatus for anchoring, or extending an anchor of, a fall protection system and providing an alert that a fall has occurred, the apparatus comprising:

a housing;

an electronic transmitting device in the housing;

an electronic circuit in the housing which activates the electronic transmitting device either (i) when the electronic circuit is open or (ii) when the electronic circuit is closed;

the electronic circuit comprising a first switch element and a second switch element for opening and closing the circuit;

the second switch element having a distal end which extends into the housing, the second switch element also having a proximal end outside of the housing which will receive a pulling force exerted by a falling person wearing the fall protection system when the fall protection system is directly or indirectly connected to the apparatus;

the second switch element being retained in a first position with respect to the first switch element by a retaining force which is less than a pulling force exerted on the second switch element by a falling person wearing the fall protection system so that the pulling force exerted by the falling person will pull the second switch element to a second position with respect to the first switch element; and the electronic transmitting device is activated to transmit a fall alert signal when the second switch element is in the second position with respect to the first switch element but not when the second switch element is in the first position with respect to the first switch element;

the second switch element comprising a pull pin, the distal end of the second switch element being a distal end of the pull pin and the proximal end of the second switch element being a proximal end of the pull pin;

further comprising:

the pull pin extending into a first end of the housing;

the apparatus further comprising a load transfer strap or belt having (i) a first end which will receive the pulling force exerted by the falling person wearing the fall protection system when the fall protection system is directly or indirectly connected to the first end of the load transfer strap or belt of the apparatus and (ii) a second end opposite the first end;

the proximal end of the pull pin being connected to the load transfer strap or belt at a first location on the load transfer strap or belt between the first end and the second end of the load transfer strap or belt, the first location on the load transfer strap or belt being closer to the first end than to the second end of the load transfer strap or belt;

the housing having a connecting structure at a second end of the housing, opposite the first end of the housing, which is connected to the load transfer strap or belt at a second location on the load transfer strap or belt between the first end and the second end of the load transfer strap or belt, the second location on the load transfer strap or belt being closer to the second end than to the first end of the load transfer strap or belt; and the second location on the load transfer strap or belt being separated from the first location on the load transfer strap or belt by a distance which is greater than a distance from the first end to the second end of the housing so that when the pulling force exerted by the falling person wearing the fall protection system is received by the first end of the load transfer strap or belt, the pulling force will initially act to pull the pull pin out of the first end of the housing.

13. The apparatus of claim 12 further comprising the second switch element contacting the first switch element when the second switch element is in the first position.

14. The apparatus of claim 12 further comprising the second switch element contacting the first switch element when the second switch element is in the second position.

* * * * *